Figure 4:
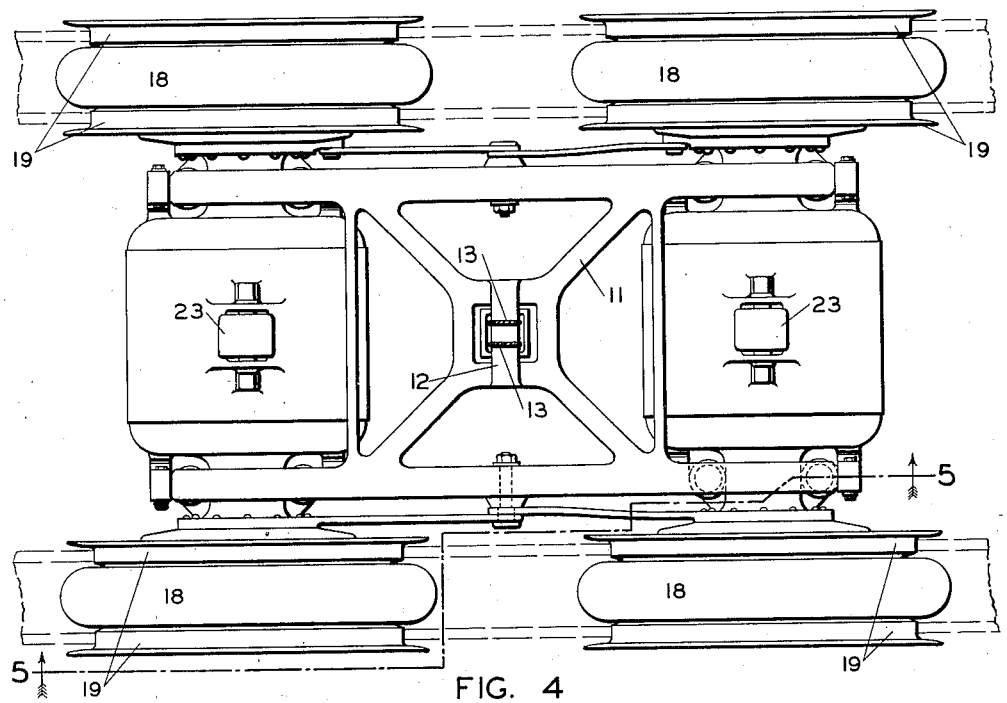
Figure 5:
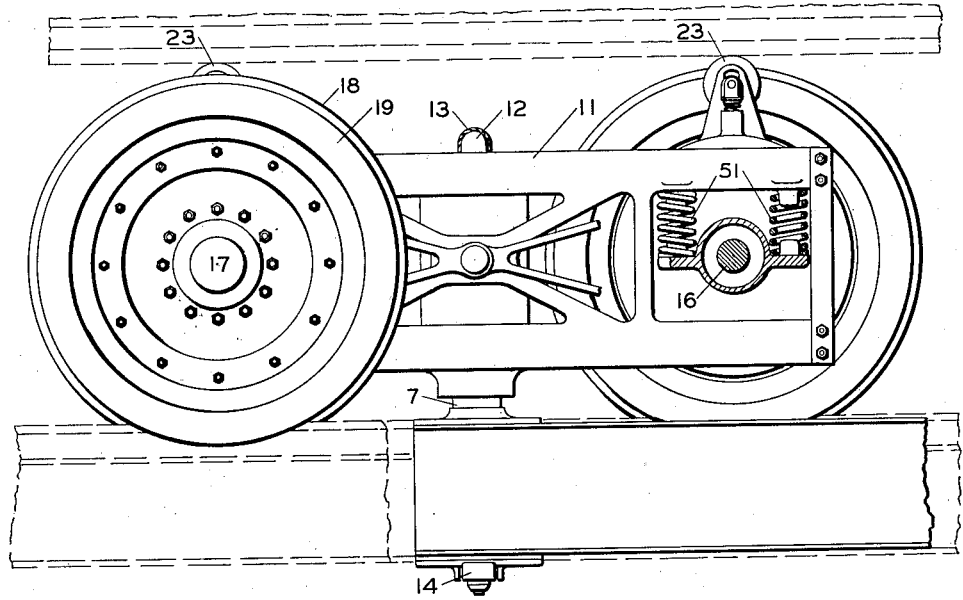
Figure 7:
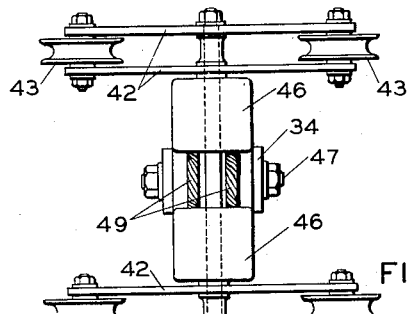
Figure 9:
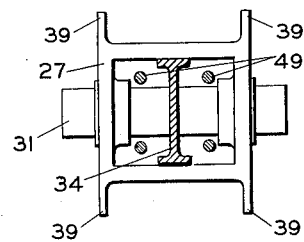
Figure 6:
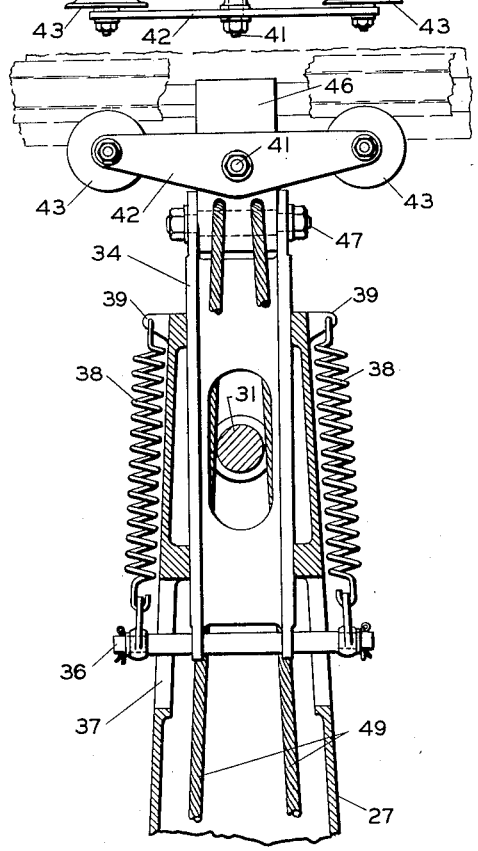
Figure 8:
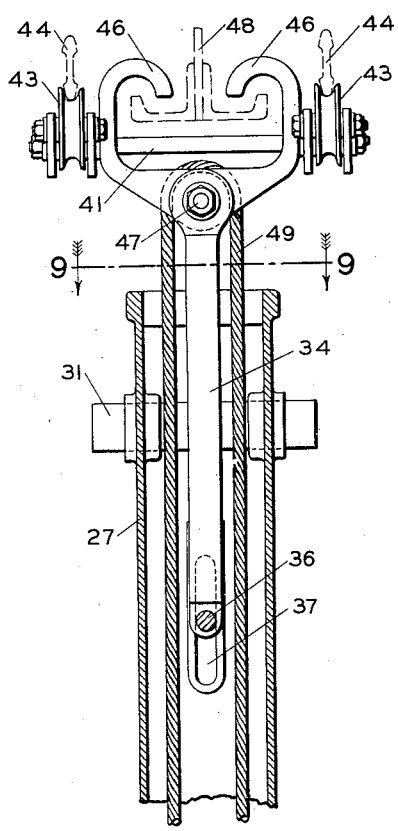
Figure 10:
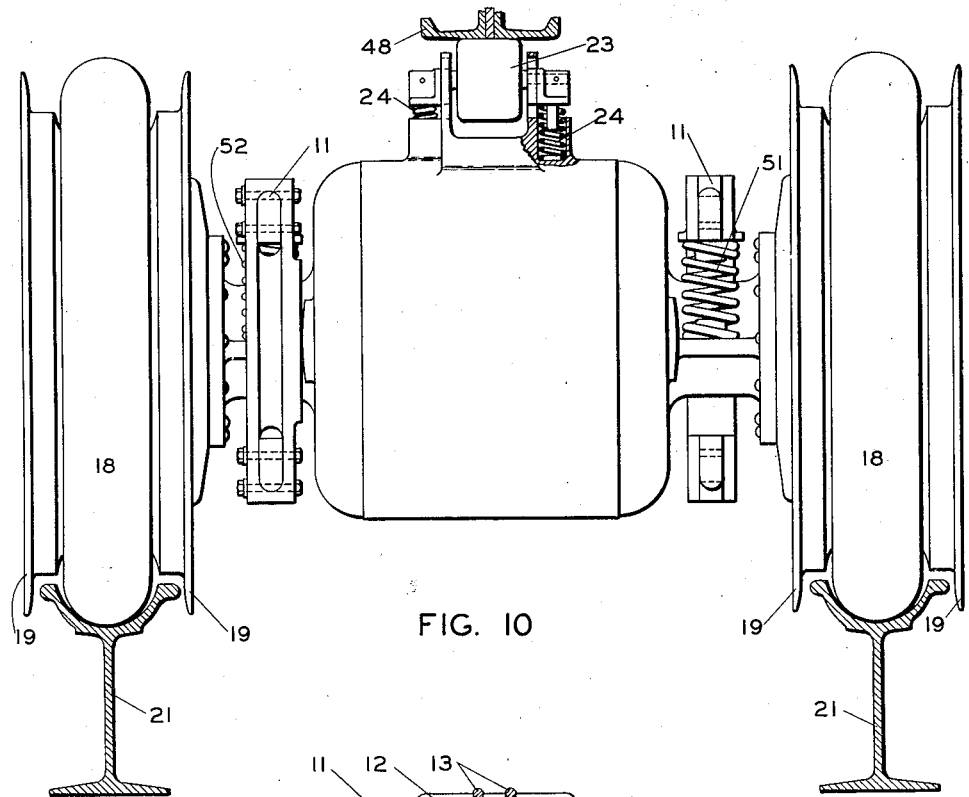
Figure 11:
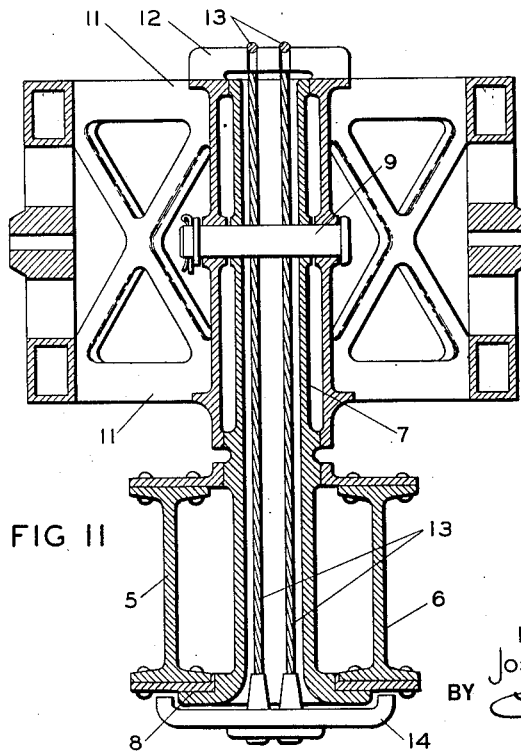

Nov. 10, 1936.   J. B. STRAUSS   2,060,402
COMBINED TRUCK AND SUPPORTING MECHANISM FOR AERIAL CARS
Filed Sept. 24, 1934   4 Sheets-Sheet 1
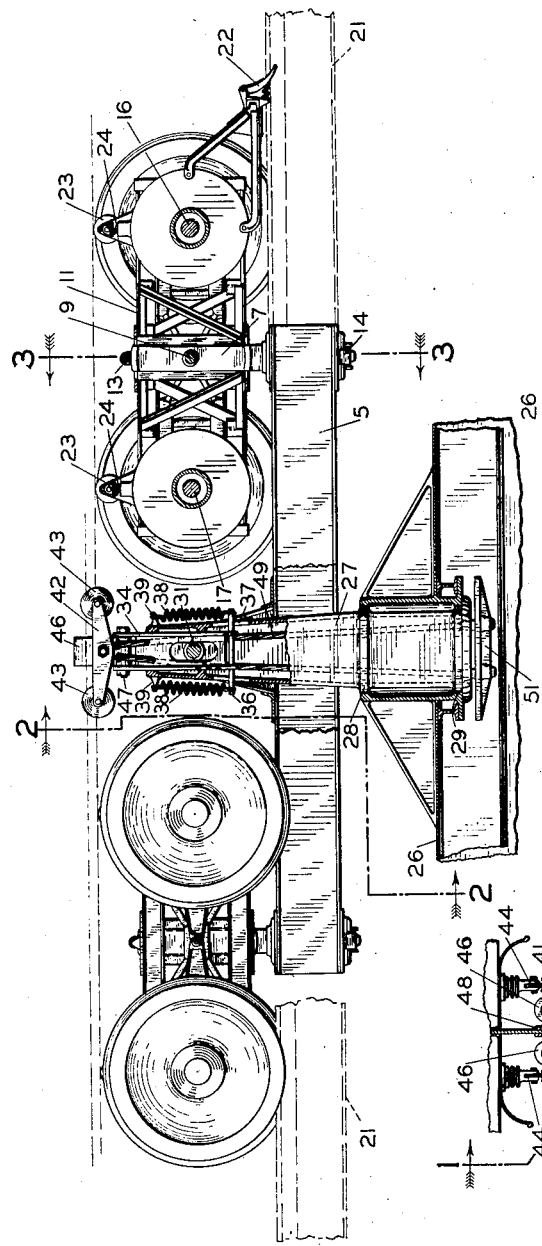
INVENTOR
Joseph B. Strauss
BY
ATTORNEY Nov. 10, 1936.  J. B. STRAUSS  2,060,402
COMBINED TRUCK AND SUPPORTING MECHANISM FOR AERIAL CARS
Filed Sept. 24, 1934   4 Sheets-Sheet 2

INVENTOR
Joseph B. Strauss
BY
ATTORNEY

Nov. 10, 1936.  J. B. STRAUSS  2,060,402
COMBINED TRUCK AND SUPPORTING MECHANISM FOR AERIAL CARS
Filed Sept. 24, 1934  4 Sheets-Sheet 3

INVENTOR
Joseph B. Strauss
BY
ATTORNEY

Nov. 10, 1936.  J. B. STRAUSS  2,060,402
COMBINED TRUCK AND SUPPORTING MECHANISM FOR AERIAL CARS
Filed Sept. 24, 1934  4 Sheets-Sheet 4

INVENTOR
Joseph B. Strauss
BY
ATTORNEY

Patented Nov. 10, 1936

2,060,402

UNITED STATES PATENT OFFICE 2,060,402

COMBINED TRUCK AND SUPPORTING MECHANISM FOR AERIAL CARS

Joseph B. Strauss, San Francisco, Calif.

Application September 24, 1934, Serial No. 745,268

3 Claims. (Cl. 105—155)

This invention relates to improvements in combined trucks and supporting mechanism for aerial cars.

The principal object of the invention is to provide a truck and supporting mechanism for an overhead transportation system wherein any tendency of the wheels to leave the tracks will be eliminated.

Another object is to provide means whereby the various wheels of a multiple wheel truck will be held in alignment during the stopping or starting of the car, in counter-distinction to the tendency of multiple wheels to climb or leave the track surface.

Another object is to produce a device whereby safety suspension means may be incorporated in the trunnions connecting the truck to the car.

A further object is to provide means whereby the effect of centrifugal force is eliminated from car and passengers by allowing the requisite amount of side sway in the suspended car.

An additional object is to provide means whereby the trucks and car supporting structure cannot drop even though the tracks are removed.

A further object is to provide means whereby objectionable noises incident to the operation of the trucks, are removed through the employment of resilient tires.

A still further object is to limit the resilient action of the tires in an upward direction.

Other objects and advantages will be apparent during the course of the following description.

In the accompanying drawings forming a part of this specification and in which like numerals are employed to designate like parts throughout the same, Fig. I is a side elevation of my truck and car supporting structure taken on the line 1—1 of Fig. II, Fig. II is a cross sectional view showing certain parts in elevation taken on the line 2—2 of Fig. I, Fig. III is a cross sectional view on the line 3—3 of Fig. I, Fig. IV is a top plan view of one of the trucks on an enlarged scale, Fig. V is a side elevation of Fig. IV and showing a portion in cross section, Fig. VI is a fragmentary sectional view of the safety car hanger, Fig. VII is a top plan view of Fig. VI, Fig. VIII is a fragmentary cross sectional view of the safety car hanger and taken at right angles to that of Fig. VI, Fig. IX is a cross section taken on the line 9—9 of Fig. VIII, Fig. X is an end elevation of Fig. IV on an enlarged scale, and Fig. XI is an enlarged detail view of one of the beam hangers.

Applicant has devised a safety truck wherein the wheels cannot climb out of the tracks and if the track should break and drop away even then the trucks cannot drop and injure the occupants of the car suspended therefrom.

In accomplishing this, applicant has employed a novel structure comprising a pair of trucks spaced a distance apart and joined by beams 5 and 6 through the medium of suspension members 7. As the suspension members at both ends of the beams are identical, and also both trucks are identical, but one will be described.

Referring now to Fig. III it will be noted that the suspension member 7 has its bottom flared as at 8 so as to provide a rotatable bearing between the same and the beams 5 and 6. A bolt 9 serves to connect the member 7 to the truck which is designated as a whole by the numeral 11. This suspension member is hollow and carries a yoke 12 at its upper end. Safety cables 13 looped over the yoke 12 may pass through the suspension member and be attached to a safety bar 14. Each of the trucks carries a pair of axles 16 and 17 and it will be here noted that the axles 16 and 17 and pin 9 are in alignment with each other, the purpose of which will be hereinafter seen. Each of these axles 16 and 17 carries wheels having resilient tires 18 which have flanged rims with auxiliary shoulders 19. The resilient tires are adapted to enter rails 21 which have a dished tread, the result being that if the tire becomes damaged or deflated the wheel will drop slightly and the weight will be carried on the auxiliary flanges or shoulders, thus avoiding any interruption to travel or inconvenience to passengers. A resilient scoop 22 enters each of the rails so as to remove any obstruction which might possibly fall onto the rail surface. Mounted upon each end of the trucks and directly above the axles thereof are limit movement safety wheels 23. These safety limit wheels are resiliently mounted through the medium of springs 24.

Referring now to Figs. II, VIII and IX it will be noted that the top of the car 26 is suspended beneath the beams 5 and 6 through the medium of a hanger 27, and by referring to Fig. I, it will be noted that the bottom of the hanger is provided with bearing surfaces 28 and 29 so that the hanger becomes a trunnion about which the car may pivot. This hanger is supported from the beams 5 and 6 by a pivot pin 31 and it is to be here noted that this pivot pin is also in horizontal alignment with the axles 16 and 17 and the pivot 9, the purpose of which will be later seen. Arms 32 extend to opposite sides of the structure and overlie the rails 21, thus adding a further safety feature. Tie bolts 33 are loosely connected to the top of the car 26 and to the arms 32. Springs carried by the tie bolts 33 serve to prevent any rattle and yet permit these bolts to move a sufficient amount when the car pivots upon the bearings 28 and 29.

Slidably carried in the upper end of the hanger 27 is a slider 34 having a pin 36 extending therethrough and slidable in slots 37 formed in the hanger. Springs 38 connect to the ends of the pin 36 and to spaced supports 39. This construction causes the slider 34 to tend to rise upwardly. Pivotally connected to the slider is a safety hook 46, the pivot pin bearing numeral 47, said safety hook carries a shaft 41 to which rocker arms 42 are attached, and it will be obvious that the collector wheels 43 pivoted between the ends of the rocker arms will be held in engagement with trolley wires 44. The safety hook 46 has its ends overlying a safety rail 48. This safety rail has a flat undersurface against which the limit movement safety wheels 23 may contact. Safety cables 49 are looped over the pivot pin 47 and have their ends extending downwardly through the hanger 27 and connected to a plate 51 mounted below the bearing 29. This arrangement permits the slider 34 to move up and down a limited amount to accommodate for the minor variations which may occur in road bed and trolley suspension as well as the resiliency of the tires and yet maintains the plate 51 in such close proximity should a section of the track be removed, the truck in dropping would cause the safety hooks 46 immediately to engage the safety rail 48 and the weight of the car would then, in turn, be taken up by the cables 49.

By viewing Fig. III it will be noted that opposite sides of the trucks are supported on springs 50 and 52 from the axle housing, thus it will be apparent that as a car moves around a curve the entire car may swing in a pendulum effect compressing one of the springs and expanding the other of the springs. This pendulum effect eliminates any tendency for the passengers to be thrown against the side of the car as now occurs when the ordinary surface car rounds a bend. It is, of course, understood that in all curves there is a superelevation of the outside track which tends to assist in this action. However, various speeds will produce various effects irrespective of the superelevation and consequently it is the spring action which compensates to always permit the car to assume a proper swing in order to relieve the passengers of any discomfort.

It will thus be seen that I have produced a truck wherein the resilient tires will eliminate unnecessary noise incident to overhead travel, and I have provided a structure wherein all of the suspension points are in horizontal alignment. Therefore, in either stopping or starting the car, all movement is in a direct line through the center of the axis of each point of suspension, and as a result there is no tendency for the trucks to climb about the pivotal point of suspension. Also the limit movement wheel permits the resilient action of the tires and eliminates any possibility of the tire leaving the rail surface. The flanges upon the wheel also eliminate any possibility of side movement, should a tire become damaged in any manner and will take the load if need be. Thus it will be apparent that my construction is such that a car suspended therefrom, will be as safe, if not safer, than the ordinary surface-borne vehicle.

It is to be understood that the form of my invention herewith shown and described is to be taken as a preferred example of the same and that various changes relative to the material, size, shape and arrangement of parts may be resorted to without departing from the spirit of the invention or the scope of the subjoined claims.

Having thus described my invention, I claim:—

1. A vehicle supporting structure comprising a pair of spaced trucks having resilient supported wheels, suspension members connected to each of said trucks, the point of suspension of each of said members being in the same plane as the pivotal axis of said wheels, supporting beams extending between said suspension members and having vertical pivotal connection therewith, a hanger supported by said beams, and a car carried by said hanger.

2. A vehicle supporting structure comprising a pair of spaced trucks having resilient supported wheels, suspension members connected to each of said trucks, the point of suspension of each of said members being in the same plane as the pivotal axis of said wheels, supporting beams extending between said suspension members and having pivotal connection therewith, a hanger supported by said beams, a car carried by said hanger, bearings formed on the lower portion of said hanger, said car being pivotally mounted on said bearings, a plate mounted within said car, a pair of safety cables extending through said hanger and reaved over a support mounted at the upper end thereof, the lower ends of said cables being attached to said plate.

3. In a device of the character described, a pair of spaced trucks having axles and wheels mounted thereon, said wheels being capable of engagement with a track, a safety rail mounted above said tracks and midway between the planes of the webs of said tracks, limit movement safety wheels mounted on said trucks and capable of engaging said safety rail, suspension members connected to each of said trucks at a point midway between the axles thereof, the suspension point of said hangers being in the same horizontal plane as the axis of said axles, a connecting member between said suspension members, a hanger carried by said connecting member, bearings formed on said hanger whereby a structure supported by said hanger may rotate thereabout, a pair of safety hooks resiliently supported above said hanger, a plate positioned beneath said suspended structure, and cables connecting said safety hooks and said plate.

JOSEPH B. STRAUSS.